US009764692B2

(12) United States Patent
Beere

(10) Patent No.: US 9,764,692 B2
(45) Date of Patent: Sep. 19, 2017

(54) SHELVING UNIT WITH ADJUSTABLE SHELF

(71) Applicant: RANGER DESIGN, Montreal, Quebec (CA)

(72) Inventor: Gary Beere, Pointe Clarie (CA)

(73) Assignee: Ranger Design, Montreal, QC (CA)

( * ) Notice: Subject to any disclaimer, the term of this patent is extended or adjusted under 35 U.S.C. 154(b) by 0 days.

(21) Appl. No.: 14/936,989

(22) Filed: Nov. 10, 2015

(65) Prior Publication Data

US 2017/0129411 A1    May 11, 2017

(51) Int. Cl.
| | | |
|---|---|---|
| *A47B 57/16* | (2006.01) | |
| *A47B 57/18* | (2006.01) | |
| *A47B 57/10* | (2006.01) | |
| *B60R 7/08* | (2006.01) | |
| *B60R 11/06* | (2006.01) | |

(52) U.S. Cl.
CPC .............. *B60R 7/08* (2013.01); *A47B 57/10* (2013.01); *A47B 57/16* (2013.01); *A47B 57/18* (2013.01); *B60R 11/06* (2013.01)

(58) Field of Classification Search
CPC ......... A47B 57/06; A47B 57/16; A47B 57/18; A47B 57/20; A47B 57/08; A47B 57/10; A47B 57/22; A47B 47/024; A47B 47/027
USPC ........................................................ 211/187
See application file for complete search history.

(56) References Cited

U.S. PATENT DOCUMENTS

| | | | | |
|---|---|---|---|---|
| 471,481 | A | * 3/1892 | Hart ....................... | A47B 57/20 211/153 |
| 721,404 | A | * 2/1903 | Wege ..................... | A47B 57/20 108/147.16 |
| 929,723 | A | * 8/1909 | Stearns .................. | A47B 57/16 108/110 |
| 949,288 | A | * 2/1910 | Stearns .................. | A47B 57/16 108/110 |
| 1,235,679 | A | 8/1917 | Gerberich | |
| 1,386,168 | A | * 8/1921 | Erickson ................ | A47B 57/16 108/109 |
| 1,750,696 | A | 3/1930 | Vance | |

(Continued)

FOREIGN PATENT DOCUMENTS

| | | | |
|---|---|---|---|
| DE | 2523393 A1 | * 12/1976 | ............. A47B 57/10 |
| DE | 2548721 A1 | * 5/1977 | ............. A47B 57/10 |

(Continued)

*Primary Examiner* — Stanton L Krycinski
(74) *Attorney, Agent, or Firm* — William H. Honaker; Dickinson Wright PLLC

(57) ABSTRACT

A shelving unit for supporting objects in a vehicle includes one or more adjustable shelves all extending transversely and horizontally between a pair of upright side panels. A rear vertical rail extends along one edge of each of the side panels and defines a plurality of slot shaped rear apertures. A front vertical rail extends along an opposite and parallel edge of each side panel. Each adjustable shelf includes a pair of shelf sides extending parallel to and adjacent the side panels. A flange extends outwardly from each of the shelf sides with a bolt attaching the flange to a front vertical rail and applying a rearward biasing force to the adjustable shelf. A rear tab extends rearwardly from each of the shelf sides and is angled laterally inwardly to engage a rear aperture in a wedging force-fit in response to the rearward biasing force.

18 Claims, 5 Drawing Sheets

(56) References Cited

U.S. PATENT DOCUMENTS

| | | | | |
|---|---|---|---|---|
| 2,415,825 | A | * | 2/1947 | Knuth .................... A47B 57/20 108/147.16 |
| 2,719,633 | A | * | 10/1955 | Rosenberg ........... A47B 47/024 108/109 |
| 2,808,944 | A | * | 10/1957 | Jones .................... A47B 47/025 108/107 |
| 2,992,744 | A | * | 7/1961 | Fohn ...................... A47B 57/22 108/157.13 |
| 3,225,937 | A | * | 12/1965 | Amthor, Jr. ............ A47B 57/30 108/110 |
| 3,677,202 | A | * | 7/1972 | Young .................... A47B 57/16 108/109 |
| 3,797,903 | A | * | 3/1974 | Traulsen ................ A47B 57/08 108/110 |
| 3,810,430 | A | * | 5/1974 | Siegal .................... A47B 57/10 108/109 |
| 3,999,775 | A | | 12/1976 | Brongo |
| 4,013,022 | A | | 3/1977 | Walter et al. |
| 4,073,556 | A | * | 2/1978 | Wilson, Jr. ............. A47B 57/16 248/917 |
| 4,083,458 | A | * | 4/1978 | Young, Jr. .............. A47F 5/103 108/180 |
| 4,288,132 | A | * | 9/1981 | Znamirowski ......... A47B 47/03 248/205.3 |
| 4,317,523 | A | | 3/1982 | Konstant et al. |
| 4,500,146 | A | | 2/1985 | Peterson |
| 4,603,782 | A | * | 8/1986 | Fenwick ................ A47B 57/20 108/107 |
| 4,607,576 | A | * | 8/1986 | Kranjec ................. A47B 57/16 108/107 |
| 4,674,723 | A | | 6/1987 | Bayuk |
| 4,972,783 | A | | 11/1990 | Crissman et al. |
| 5,016,545 | A | | 5/1991 | Robertson et al. |
| 5,168,431 | A | * | 12/1992 | Moulton ................ A47B 57/08 211/41.17 |
| 5,265,740 | A | * | 11/1993 | Hodsden ................ A47B 57/08 211/187 |
| 5,338,137 | A | * | 8/1994 | Jensen .................. B61D 45/001 211/187 |
| 5,595,127 | A | * | 1/1997 | Eustace ................ A47B 47/025 108/109 |
| 5,662,399 | A | | 9/1997 | Henkel et al. |
| 6,820,758 | B2 | | 11/2004 | May et al. |
| 7,134,558 | B1 | | 11/2006 | Mimlitch, III et al. |
| D536,659 | S | | 2/2007 | Panasewicz et al. |
| 7,641,253 | B2 | | 1/2010 | Steiger et al. |
| 7,987,799 | B2 | | 8/2011 | Lange et al. |
| 8,117,972 | B2 | | 2/2012 | Winget et al. |
| 8,763,820 | B2 | * | 7/2014 | Hanley .................. A47B 81/00 211/88.01 |
| 8,944,483 | B2 | | 2/2015 | Richter |
| 9,386,847 | B1 | * | 7/2016 | Jeffries ................ A47B 47/024 |
| 2007/0069542 | A1 | * | 3/2007 | Steiger ..................... B60P 3/14 296/24.44 |

FOREIGN PATENT DOCUMENTS

| | | | | |
|---|---|---|---|---|
| DE | 2654780 | A1 | * 6/1978 | ............ A47B 57/16 |
| DE | 19634377 | C1 | * 12/1997 | ............ A47B 57/16 |
| FR | 1341934 | A | * 11/1963 | ............ A47B 57/08 |
| GB | 733959 | A | * 7/1955 | ............ A47B 57/06 |
| GB | 1366205 | | 9/1974 | |

\* cited by examiner

SHELVING UNIT WITH ADJUSTABLE SHELF

BACKGROUND OF THE INVENTION

1. Field of the Invention

The present invention relates to a shelving unit for supporting objects in a vehicle such as a work van.

2. Description of the Prior Art

Shelving units with adjustable shelves for supporting objects in a vehicle are generally known in the art. U.S. Pat. No. 8,944,483, issued to Richter Feb. 3, 2015, discloses such a shelving unit that includes a first side panel and a second side panel disposed in parallel and spaced relationship with one another and a rear vertical rail extending along a second edge of each panel and defining a plurality of rear apertures spaced from one another. The Richter '483 patent also discloses an adjustable shelf extending transversely between the side panels.

U.S. Pat. No. 1,235,679, issued to Gerberich Aug. 7, 1917, discloses a shelving unit with a rear vertical rail defining a plurality of rear apertures, each having an interior wall. The Gerberich '679 patent also discloses a plurality of adjustable shelves, each including a rear tab extending into one of the rear apertures.

SUMMARY OF THE INVENTION

The invention provides for such a shelving unit that includes a fastener attaching an adjustable shelf to one of the side panels and applying a rearward biasing force to the adjustable shelf, and with the rear tab being angled and contacting an interior wall of the rear aperture in wedging force-fit engagement in response to the rearward biasing force.

The invention in its broadest aspect provides for a wedging force-fit that causes the adjustable shelf to be held tightly to the rear vertical rail. This tight fitment of the adjustable shelf serves to strengthen the shelving unit and to prevent rattling when the shelving unit is subject to vibrations, as are common in a moving vehicle.

The combination and arrangement of elements in the present invention allows a person to install or reposition one or more of the adjustable shelves at any one of several positions at different levels, while only requiring access to the front side of the shelving unit. This allows the shelving unit to be installed in locations where access to the rear and/or the sides is limited, while still allowing the adjustable shelves to be repositioned.

Additionally, because each adjustable shelf can be repositioned in the shelving unit by sliding the adjustable shelf horizontally rearward, an adjustable shelf can be positioned in close proximity to one or more fixed shelves or other adjustable shelves.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1A:
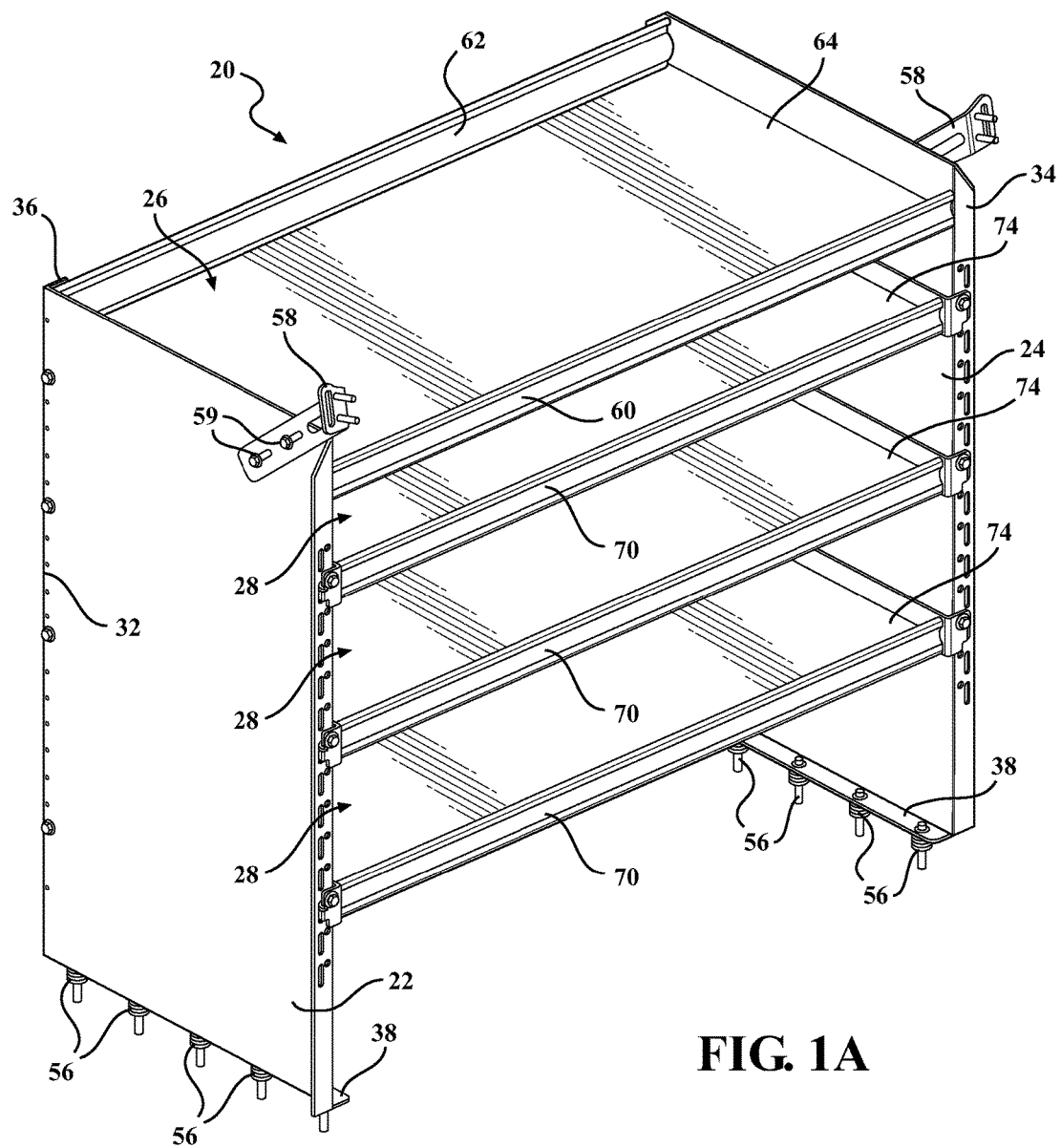
FIG. 1A is a perspective view of a shelving unit of the subject invention.
Figure 1B:
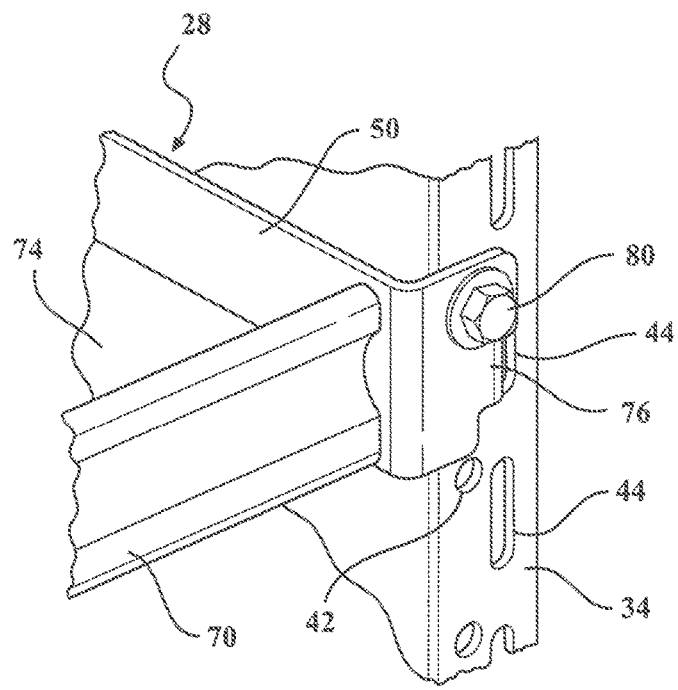
FIG. 1B is a magnified perspective view of the shelving unit illustrating the flange portion of an adjustable shelf against a front vertical rail.
Figure 2B:
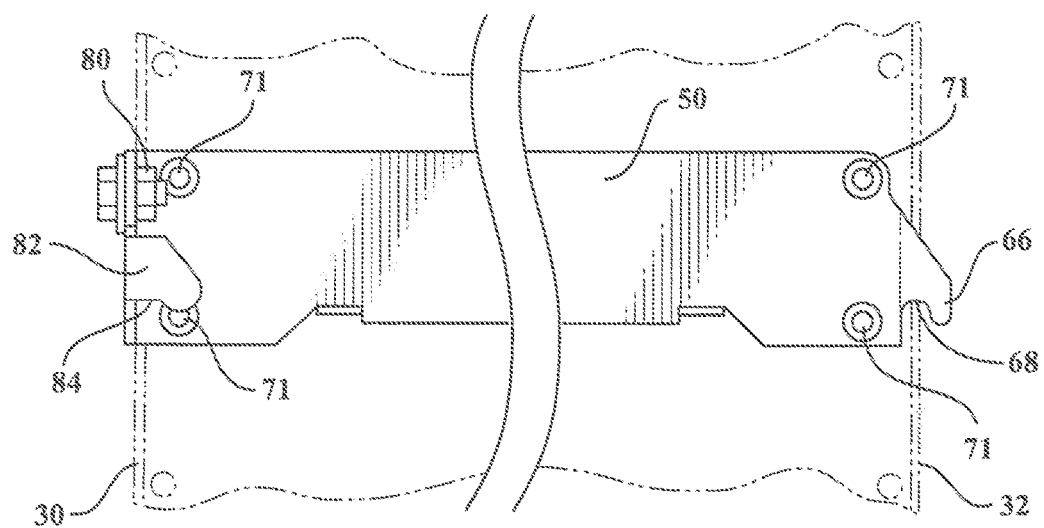
FIG. 2B is a magnified side view of an adjustable shelf within the shelving unit with a transparent side panel and transparent front and rear vertical rails.
Figure 2A:
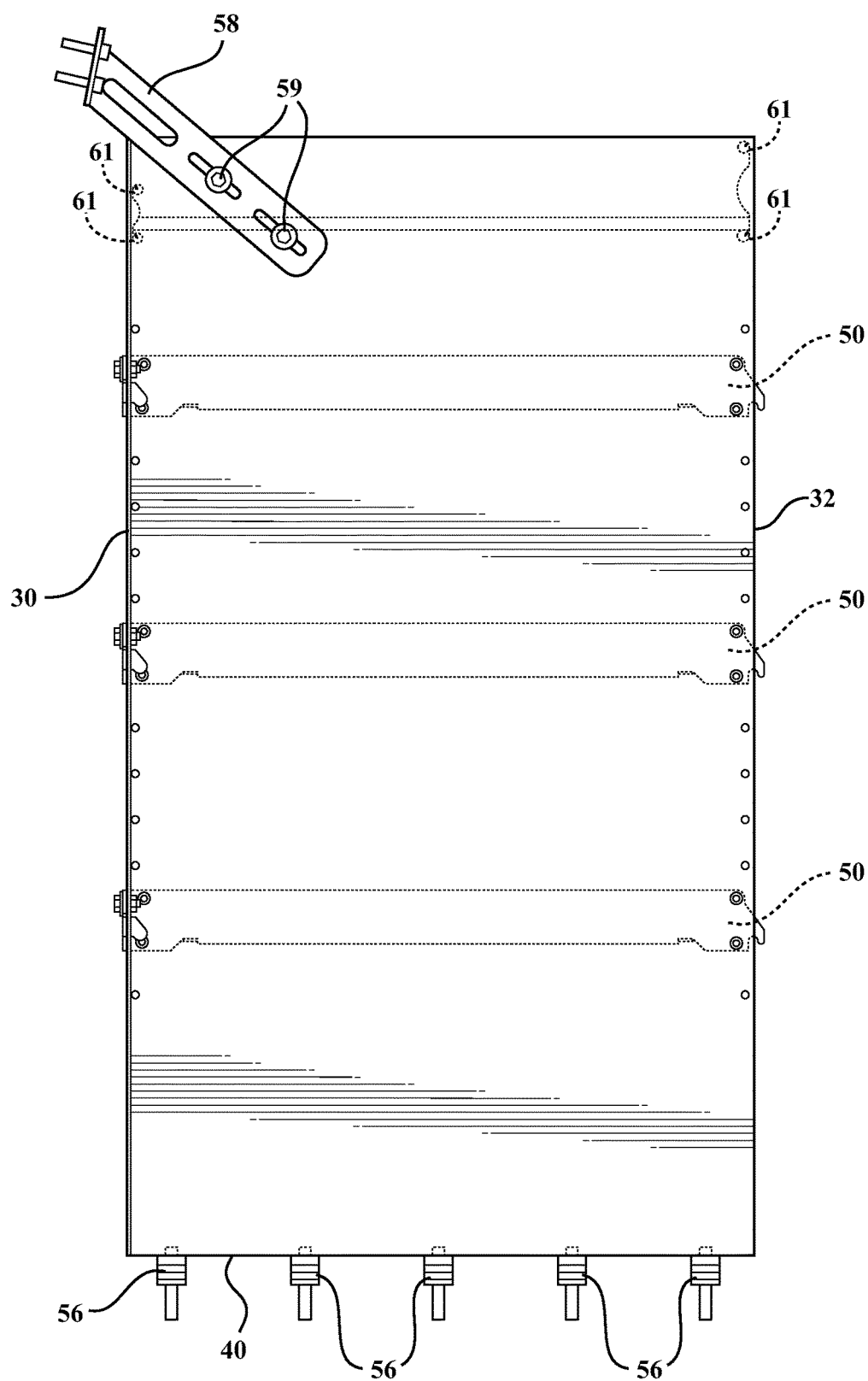
FIG. 2A is a side view of the shelving unit.

Referring to the Figures, wherein like numerals indicate corresponding parts throughout the several views, a shelving unit 20 for supporting objects in a work van is generally shown in FIGS. 1-4. The shelving unit 20 includes a first side panel 22 and a second side panel 24. In the disclosed embodiment, each is made of sheet metal, but it should be appreciated by one of ordinary skill in the art that other materials could be used, such as aluminum, plastic, etc. The panels 22 and 24 are and disposed in parallel and spaced relationship with one another and each extends between a first edge 30 along the front of the shelving unit 20 and a parallel second edge 32 along the rear of the shelving unit 20. When installed in the work van, the side panels 22, 24 stand upright.

A front vertical rail 34 extends perpendicularly outwardly from a 90-degree bend along each of the first edges 30 and a rear vertical rail 36 extends perpendicularly inwardly from a 90-degree bend along each of the second edges 32. The side panels 22, 24 are Z-shaped as viewed in a horizontal cross-section. A footer 38 extends perpendicularly inwardly from a 90-degree bend along a third edge 40 between the first edge 30 and the second edge 32 of each of the side panels 22, 24.

A fixed shelf 26 and a plurality of one or more adjustable shelves 28 extend transversely and horizontally between the side panels 22, 24.

Each of the front vertical rails 34 defines a plurality of front apertures 44 spaced at regular intervals along the length of the front vertical rails 34 to define positions for placement of the adjustable shelves 28. In the disclosed embodiment, the front apertures 44 have a slot shape with vertical sides extending between a top section of semicircular shape and a bottom section of semicircular shape. It should be appreciated by one of ordinary skill in the art that other shapes could be used for the slots, such as for example, vertical sides with square ends, v-shaped ends, etc. Each of the front vertical rails 34 also defines a plurality of round first bolt holes 42, each located proximate to and laterally inwardly from a respective one of the front apertures 44.

Figure 3A:
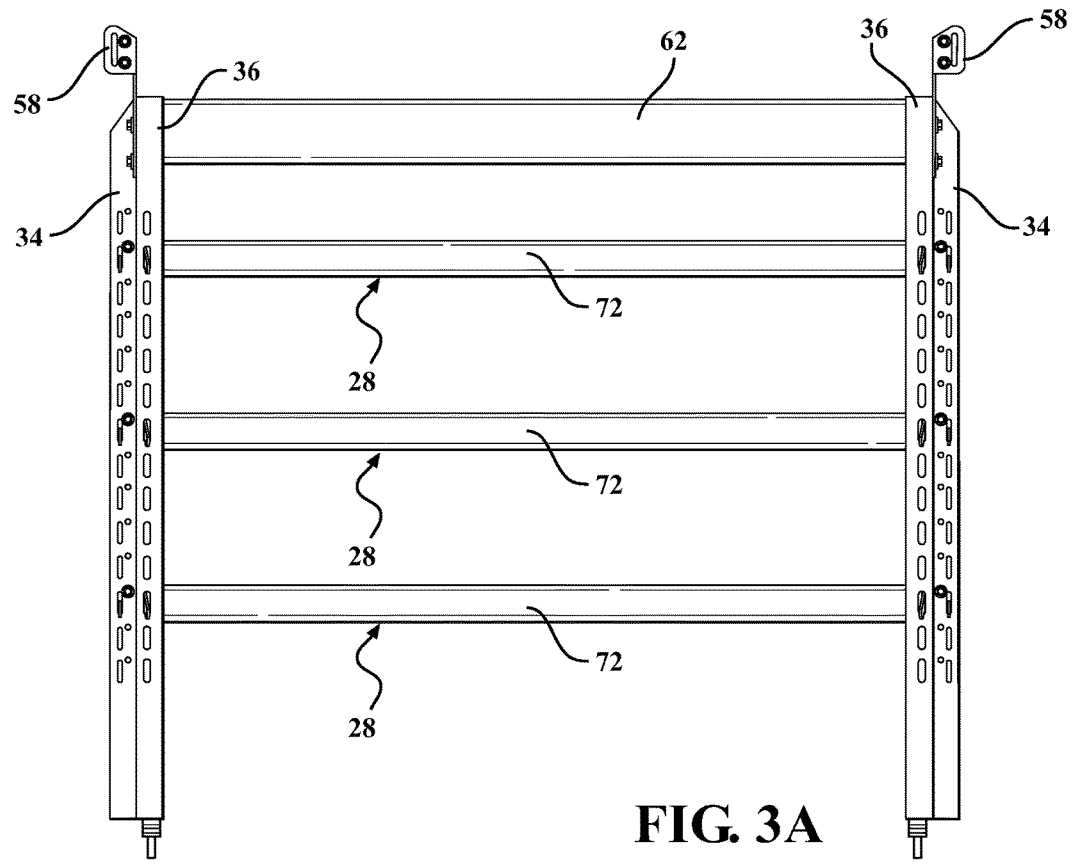
FIG. 3A is a back view of the shelving unit.
Figure 3B:
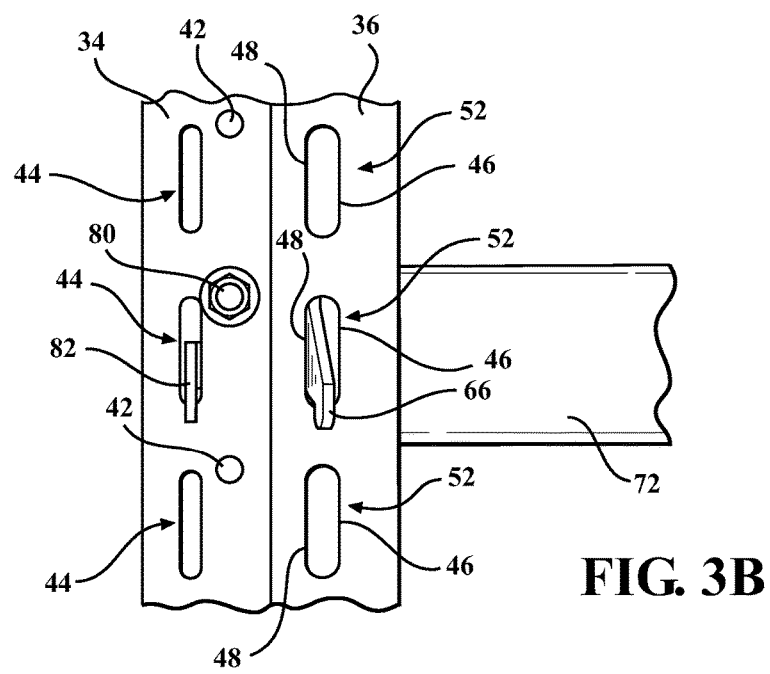
FIG. 3B is a magnified back view of the front tab and the rear tab of an adjustable shelf with the front and rear vertical rails.
Figure 4:
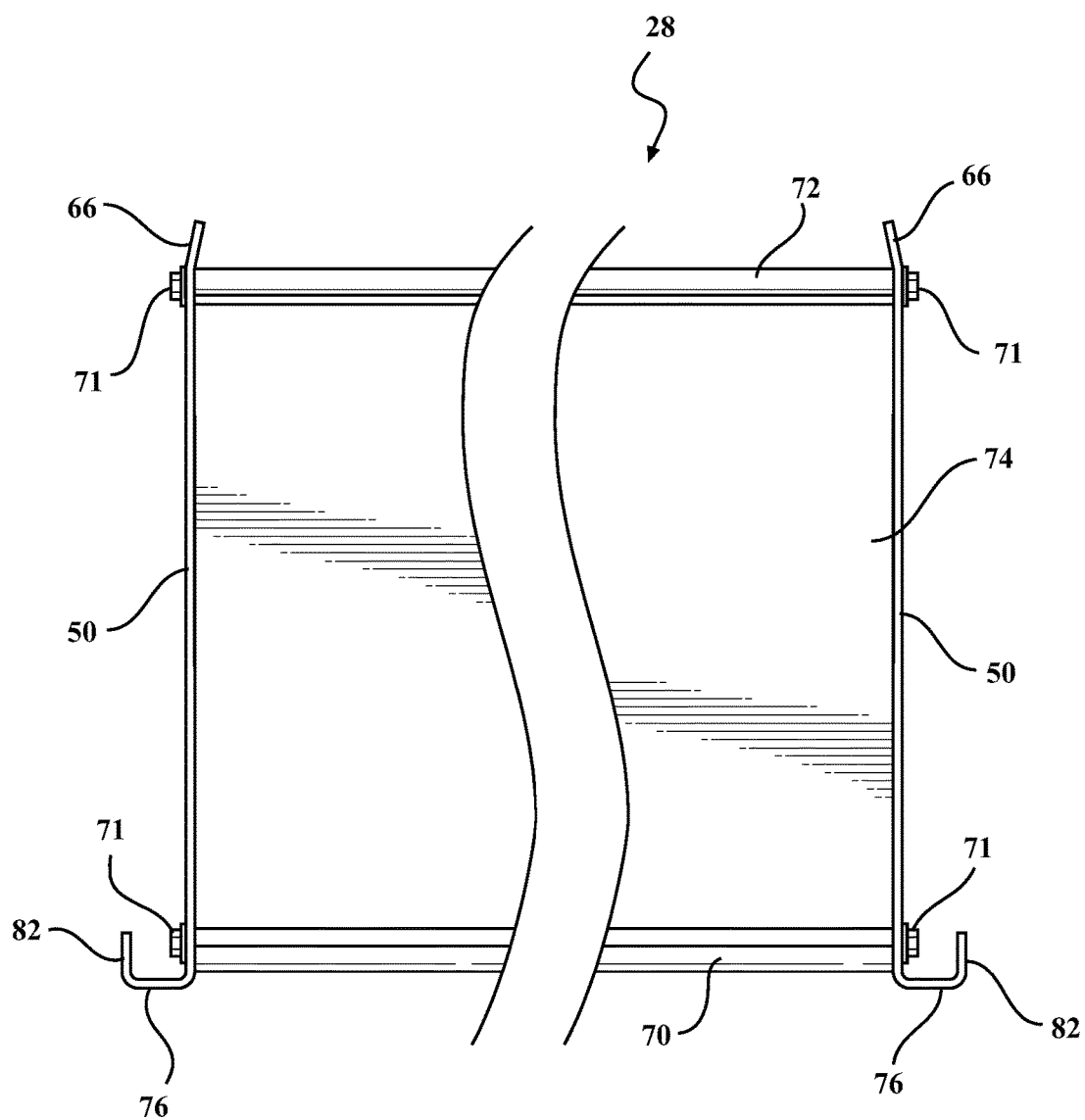
FIG. 4 is a top view of an adjustable shelf of the subject invention.

As best shown in FIGS. 3A and 3B, each of the rear vertical rails 36 defines a plurality of rear apertures 52, each disposed in offset alignment with a corresponding one of the front apertures 44 and each having a slot shape with a pair of interior walls 46, 48 extending vertically between end portions of semicircular shape. It should be appreciated by one of ordinary skill in the art that other shapes could be used for the slots, such as for example, vertical sides with square ends, v-shaped ends, etc. The first interior wall 46 is disposed laterally closest to the opposite one of the rear vertical rails 36, and the second interior wall 48 is disposed laterally away from the opposite one of the rear vertical rails 36. In other words, the first interior wall 46 is closest to the center of the shelving unit 20, and the second interior wall 48 is farthest from the center of the shelving unit 20.

Each of the footers 38 defines a plurality of anchor holes 54 for receiving anchor fasteners 56 to secure the shelving unit 20 to the work van. The anchor fasteners 56 may be any suitable fastening means such as bolts, screws, rivets, or welds.

In the disclosed embodiment, bracket 58 having an L-shape is attached with a plurality of first fasteners 59 to an upper portion of each of the side panels 22, 24, opposite the footers 38, for securing the shelving unit 20 to the work van.

In the disclosed embodiment, the fixed shelf 26 comprises a first crossbar 60 proximate the first edges 30 at the front side of the shelving unit 20 and a second crossbar 62 proximate the second edges 32 at the rear side of the shelving unit 20. In the disclosed embodiment, both the first crossbar 60 and the second crossbar 62 are made of extruded aluminum extending between and fastened to each of the side panels 22, 24 with a plurality of second fasteners 61. It should be appreciated that other materials could be used, such as, for example, sheet metal, plastic, etc. As disclosed, a first shelf tray 64 of plywood extends between the side panels 22, 24 and between the first crossbar 60 and the second crossbar 62. It should be appreciated that other materials could be used, such as for example, aluminum, steel, plastic, etc.

Each of the adjustable shelves 28 includes a pair of shelf sides 50 of for example, sheet metal extending in spaced and parallel relationship from one another with each disposed adjacent one of the side panels 22, 24. A third crossbar 70, also called a front crossbar, extends between the shelf sides 50 proximate the first edges 30 at the front side of the shelving unit 20 and a fourth crossbar 72, also called a rear crossbar, extends between the shelf sides 50 proximate the second edges 32 at the rear side of the shelving unit 20. Both the third crossbar 70 and the fourth crossbar 72 are made of extruded aluminum, for example, and are fastened to each of the shelf sides 50 with a plurality of third fasteners 71. A second shelf tray 74, also called an adjustable shelf tray, of plywood for example, extends between the shelf sides 50 and between the third crossbar 70 and the fourth crossbar 72.

A rear tab 66 extends rearwardly from each of the shelf sides 50 of the adjustable shelves 28 near the fourth crossbar 72 and engages one of the rear apertures 52 of the rear vertical rails 36. Each rear tab 66 is generally triangular shaped with a downward slope and a first bottom edge 68 with a semicircular indentation.

The adjustable shelves 28 also include a pair of flange portions 76 that extend outwardly from each of the shelf sides 50 at a 90-degree bend opposite the rear tab 66. Each flange portion 76 defines a second bolt hole therethrough (located behind fastener 80 in the figures) with a fourth fastener 80 extending through the second bolt hole and attaching the flange portion 76 to the front vertical rail 34 and applying a rearward biasing force to the adjustable shelf 28 toward the rear vertical rails 36.

In the preferred embodiment, the fourth fastener 80 is a bolt that is disposed within and between the second bolt hole of the flange portion 76 and one of the first bolt holes 42 in the corresponding front vertical rail 34. The fourth fastener may be any suitable fastener including, but not limited to, a bolt, screw, stud, nut, rivet, pin, clip, latch, or any combination thereof.

Each of the rear tabs 66 is angled laterally inwardly and contacts the second interior wall 48 of the corresponding rear aperture 52 in wedging force-fit engagement in response to the rearward biasing force of the fourth fastener 80. When the fourth fasteners 80 are engaged or tightened, the adjustable shelf 28 is held tightly to each of the front vertical rails 34. Additionally, the wedging force-fit causes the adjustable shelves 28 to be held tightly to the rear vertical rails 36. This tight fitment of the adjustable shelves 28 serves to strengthen the shelving unit 20 and to prevent rattling when the shelving unit 20 is subject to vibrations, as are common in a moving vehicle.

The flange portions 76 each extend outwardly to a 90-degree bend that defines a front tab 82 which extends rearward toward the rear tab 66 in spaced and parallel relationship to the shelf sides 50. Each of the front tabs 82 has a generally triangular shape with a downward slope and a second bottom edge 84 with an indentation proximate the flange portion 76. Each of the front tabs 82 engages one of the front apertures 44 of one of the front vertical rails 34.

The combination and arrangement of elements in the present invention allows a user to install or reposition one or more of the adjustable shelves 28 at any one of several positions at different levels, while only requiring access to the front side of the shelving unit 20. This allows the shelving unit 20 to be installed in locations where access to the rear and the sides is limited, while still allowing the adjustable shelves to be repositioned.

Additionally, because each adjustable shelf 28 can be repositioned in the shelving unit 20 by sliding the adjustable shelf 28 horizontally rearward, an adjustable shelf 28 can be positioned in the next adjacent position and in close proximity to one or more fixed shelves 26 or adjustable shelves 28.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A shelving unit for supporting objects in a vehicle comprising;
   a first side panel and a second side panel disposed in parallel and spaced relationship with one another with each of said side panels extending between a first edge and a second edge,
   a first rear vertical rail extending along said second edge of said first side panel and a second rear vertical rail extending along said second edge of said second side panel, with each of said rear vertical rails defining a plurality of rear apertures spaced from one another and each having at least one interior wall,
   at least one adjustable shelf extending transversely between said side panels and including a pair of shelf sides each extending longitudinally and in spaced and parallel relationship with one another and each disposed adjacent one of said side panels,
   a rear tab extending longitudinally from one of said shelf sides into one of said rear apertures of said rear vertical rails,
   a fastener attaching said adjustable shelf to one of said side panels and applying a rearward biasing force to said adjustable shelf toward said rear vertical rails, said rear tab being angled obliquely from said one of said shelf sides and contacting said interior wall of said rear aperture in wedging force-fit engagement in response to the rearward biasing force.

2. A shelving unit for supporting objects in a vehicle as set forth in claim 1 wherein each of said rear apertures has a slot shape with said at least one interior wall being a pair of interior walls extending vertically between end portions with said interior walls including a first interior wall disposed laterally proximate to an opposing one of said rear vertical rails and a second interior wall disposed laterally away from said opposing one of said rear vertical rails.

3. A shelving unit for supporting objects in a vehicle as set forth in claim 2 wherein said rear tab is angled laterally inwardly toward said opposing one of said rear vertical rails and away from said one of said shelf sides and wherein said rear tab contacts said second interior wall of said rear aperture in wedging force-fit engagement in response to the rearward biasing force of said fastener.

4. A shelving unit for supporting objects in a vehicle as set forth in claim 2 wherein said rear tab is angled laterally outwardly away from said opposing one of said rear vertical rails and away from said one of said shelf sides and wherein said rear tab contacts said first interior wall of said rear aperture in wedging force-fit engagement in response to the rearward biasing force of said fastener.

5. A shelving unit for supporting objects in a vehicle as set forth in claim 1 further including said at least one adjustable shelf further including a flange portion extending outwardly from at least one of said shelf sides opposite said rear tab with said fastener attaching said flange portion to one of said side panels and applying the rearward biasing force to said adjustable shelf.

6. A shelving unit for supporting objects in a vehicle as set forth in claim 5 further including a front vertical rail extending along said first edge of at least one of said side panels and attached to said flange portion of said adjustable shelf.

7. A shelving unit for supporting objects in a vehicle as set forth in claim 6 further including said front vertical rail defining a plurality of front apertures spaced at regular intervals along the length of said front vertical rail in offset alignment with said rear apertures to define positions for placement of said at least one adjustable shelf, and said flange portion defining a front tab extending rearwardly toward said rear tab and engaging one of said front apertures of said front vertical rail.

8. A shelving unit for supporting objects in a vehicle as set forth in claim 7 further including said flange portion extending outwardly to a 90-degree bend and continuing rearwardly toward said rear tab to define said front tab.

9. A shelving unit for supporting objects in a vehicle as set forth in claim 7 further including said front tab being of generally triangular shape with a downward slope and with a bottom edge having an indentation proximate said flange portion.

10. A shelving unit for supporting objects in a vehicle as set forth in claim 1 further including a fixed shelf extending transversely between said side panels, and said fixed shelf including a first crossbar extending between and fastened to said side panels proximate said first edges and a second crossbar extending between and fastened to said side panels proximate said second edges, and a first shelf tray extending between said side panels and between said first crossbar and said second crossbar.

11. A shelving unit for supporting objects in a vehicle as set forth in claim 1 with said at least one adjustable shelf further including a front crossbar extending between and fastened to said shelf sides proximate said first edges and a rear crossbar extending between and fastened to said shelf sides proximate said second edges, and an adjustable shelf tray extending between said shelf sides and between said third crossbar and said fourth crossbar.

12. A shelving unit for supporting objects in a vehicle as set forth in claim 6 further including at least one of said front vertical rails defining a plurality of first bolt holes spaced at regular intervals along the length of said front vertical rail and receiving said fastener attaching said flange portion to said front vertical rail.

13. A shelving unit for supporting objects in a vehicle as set forth in claim 1 wherein said fastener includes a bolt.

14. A shelving unit for supporting objects in a vehicle as set forth in claim 1 wherein said fastener includes a screw.

15. A shelving unit for supporting objects in a vehicle as set forth in claim 5 further comprising at least one of said shelf sides extending to a 90-degree outward bend opposite said rear tab to define said flange portion.

16. A shelving unit for supporting objects in a vehicle as set forth in claim 1 further comprising a footer extending perpendicularly to at least one of said side panels along a third edge between said first edge and said second edge.

17. A shelving unit for supporting objects in a vehicle as set forth in claim 16 further including said footer defining a plurality of one or more anchor holes for receiving one or more anchor fasteners to secure said shelving unit to the vehicle.

18. A shelving unit for supporting objects in a vehicle as set forth in claim 1 further including a bracket attached to at least one of said side panels for securing said shelving unit to the vehicle.

* * * * *